United States Patent
Yeh (10) Patent No.: US 10,141,023 B2
(45) Date of Patent: Nov. 27, 2018

(54) METHOD AND SYSTEM FOR MULTIMEDIA SUMMARY GENERATION

(71) Applicant: INDUSTRIAL TECHNOLOGY RESEARCH INSTITUTE, Hsinchu (TW)

(72) Inventor: Yi-Jen Yeh, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 172 days.

(21) Appl. No.: 14/936,679

(22) Filed: Nov. 9, 2015

(65) Prior Publication Data

US 2016/0189751 A1    Jun. 30, 2016

(30) Foreign Application Priority Data

Dec. 29, 2014   (TW) .............................. 103146045 A (51) Int. Cl.
  *G11B 27/034*   (2006.01)
  *G11B 27/11*    (2006.01)
  *G11B 27/10*    (2006.01)

(52) U.S. Cl.
  CPC .......... *G11B 27/034* (2013.01); *G11B 27/105* (2013.01); *G11B 27/11* (2013.01)

(58) Field of Classification Search
  CPC ...... G11B 27/034; G11B 27/34; G11B 27/105
  (Continued)

(56) References Cited

U.S. PATENT DOCUMENTS 6,557,042 B1 *  4/2003  He ................... G06F 17/30017
                                                      707/999.001
6,870,573 B2    3/2005  Yeo et al.
(Continued)

FOREIGN PATENT DOCUMENTS

CN       103200463 A    7/2013
TW       I259719 B      8/2006
(Continued)

OTHER PUBLICATIONS

Candemir Toklu et al., "Videoabstract: A Hybrid Approach to Generate Semantically Meaningful Video Summaries", 2000.
(Continued)

*Primary Examiner* — Thai Q Tran
*Assistant Examiner* — Jose M Mesa
(74) *Attorney, Agent, or Firm* — Rabin & Berdo, P.C.

(57) ABSTRACT

A method for multimedia summary generation, adapted to a multimedia system, the method comprising: capturing a multimedia information from a multimedia source, the multimedia information comprise at least video clips or pictures; processing the multimedia information according to a predefined conditions to generate a multimedia summary candidate; generating a multimedia summary list, by checking a system threshold, if the system threshold is null, then output multimedia summary candidate and join the multimedia summary candidate to multimedia summary list; if the system threshold is not null, check the multimedia summary candidate according to the system threshold, if meet the system threshold, then output multimedia summary candidate and join to the multimedia summary candidate to multimedia summary list; if not meet the system threshold, then ignore the multimedia summary candidate; and generating a multimedia summary, by combining the multimedia summary candidate in the multimedia summary candidate list.

14 Claims, 5 Drawing Sheets

(58) Field of Classification Search
USPC .......................................................... 386/290
See application file for complete search history.

(56) References Cited

U.S. PATENT DOCUMENTS

| | | | |
|---|---|---|---|
| 8,195,038 B2 | 6/2012 | Liu et al. | |
| 8,432,965 B2 | 4/2013 | Deever | |
| 8,446,490 B2 | 5/2013 | Deever | |
| 8,665,345 B2 | 3/2014 | Karn et al. | |
| 2009/0251614 A1 | 10/2009 | Barbieri et al. | |
| 2010/0104261 A1* | 4/2010 | Liu | G11B 27/034 386/241 |
| 2011/0293018 A1 | 12/2011 | Deever | |
| 2012/0099793 A1* | 4/2012 | Kumar | G06K 9/00751 382/190 |
| 2012/0284094 A1 | 11/2012 | de Leon et al. | |
| 2012/0293686 A1 | 11/2012 | Karn et al. | |

FOREIGN PATENT DOCUMENTS

| | | |
|---|---|---|
| TW | 200705217 A | 2/2007 |
| TW | 200921454 A | 5/2009 |
| TW | 201242341 A | 10/2012 |
| TW | 201304519 A | 1/2013 |
| TW | 201417571 A | 5/2014 |

OTHER PUBLICATIONS

Yihong Gong et al., "Generating Optimal Video Summaries".
Mauro Barbieri et al., "Video Summarization: Methods and Landscape", 2003.
Liang-Hua Chen et al., "On the preview of digital movies", 2003.
S. Dagtas et al., "Extraction of TV Highlights Using Multimedia Features", 2001.
Wafae Sabbar et al., "Video Summarization Using Shot Segmentation and Local Motion Estimation" 2012.

* cited by examiner

METHOD AND SYSTEM FOR MULTIMEDIA SUMMARY GENERATION

This application claims the benefit of Taiwan application Serial No. 103146045, filed Dec. 29, 2014, the disclosure of which is incorporated by reference herein in its entirety.

TECHNICAL FIELD

The disclosure relates in general to a method and system for multimedia summary generation, and more particularly to a method and system for multimedia summary generation by using a picture or a video clip of a multimedia source captured by the user.

BACKGROUND

The play of a TV program or a multimedia content normally takes a period of time. For example, a movie would take 2 hours, a TV drama would take 0.5-1 hour, and a live play of baseball would take 3 hours. In order to catch the viewers' eyeballs or make the viewers quickly understand the highlights of the TV program or the multimedia content, the content providers normally would provide brilliant clips for the viewers. In order to produce some brilliant clips from a film, one has to select and capture clips from the TV program or the multimedia content and further judge which parts are brilliant and worthy of clipping according to his/her perspective of value. This process is time-consuming and also involves personal subjective judgement which may not meet consumers' needs or preferences. Besides, not every TV program or multimedia content provider provides a multimedia summary.

Along with the development of on-line multimedia technology, more and more consumers tend to capture pictures or clips from TV programs or multimedia sources according to their personal preferences, and further upload the captured pictures or clips to the Internet to share with others. By introducing consumers' preference from the Internet and spontaneously capturing, collecting and processing brilliant clips of the TV program or multimedia content to generate a multimedia summary for other consumers to access and view, the cost of editing the program content can be further reduced and consumers' preferences can be better satisfied.

During the process of capturing pictures or clips from TV program or multimedia sources, if program names, timestamps and other relevant information can be added to the pictures or clips and used as a basis of setting conditions, consumers will be able to access relevant multimedia summary and quickly understand key points of the multimedia content.

The abovementioned problems show that it is necessary to provide a method and system for multimedia summary generation capable of enabling multimedia source program to generate a multimedia summary adapted to the multimedia content according to users' interests.

SUMMARY

The disclosure is directed to a method and system for multimedia summary generation, and particularly to a method and system for multimedia summary generation allowing the user to capture multimedia picture or video clip. During the play of a multimedia source, the user can capture his/her interested multimedia information, including at least a video clip or a picture. A multimedia summary can be generated from many people's captured multimedia information. Besides, through the captured multimedia information, the additional name, the timestamp and other relevant information of the multimedia information can be linked to relevant TV program and multimedia content to provide a multimedia summary under various conditions. The present system is mainly used to provide interested multimedia picture and clip summary to the public when the multimedia source, such as TV program or multimedia content, is played, so that the public can conveniently and quickly understand key points of the multimedia source.

The disclosure is directed to a method for multimedia summary generation adapted to a multimedia system. The method includes following steps. A multimedia information is captured from a multimedia source, wherein the multimedia information at least includes a video clip or a picture. The video clip or picture of the multimedia information is processed according to a pre-determined condition to generate a multimedia summary candidate, wherein the pre-determined condition at least includes system setting value, overlapping time, maximum video clip length, minimum video clip length, people capturing ratio or a combination thereof for determining a start point and an end point of the video clip. A multimedia summary list is generated by checking whether a threshold is pre-determined. If no threshold is pre-determined, the multimedia summary candidate is outputted to join the multimedia summary list; if the threshold is pre-determined, whether the multimedia summary candidate meets the pre-determined threshold is checked. If the multimedia summary candidate meets the pre-determined threshold, the multimedia summary candidate is joined to the multimedia summary list; if the multimedia summary candidate does not meet the pre-determined threshold, the multimedia summary candidate is ignored. The multimedia summary candidate in combined in the multimedia summary candidate list to generate a multimedia summary.

The disclosure is directed to a system for multimedia summary generation is provided. The system includes a transmitter/receiver module, a multimedia source capturing module, a multimedia source processing module, and a multimedia source summary generation module. The transmitter/receiver module is for transmitting/receiving data. The multimedia source capturing module is for capturing a multimedia information from the multimedia source, wherein the multimedia information at least includes a video clip or a picture. The multimedia source processing module is coupled to the multimedia source capturing module for receiving the multimedia information captured by the multimedia source capturing module and for processing the video clip and the picture of the multimedia information according to a pre-determined condition to generate a multimedia summary candidate. The pre-determined condition at least includes system setting value, overlapping time, maximum video clip length, minimum video clip length, people capturing ratio or a combination thereof for determining a start point and an end point of the video clip. The multimedia source summary generation module is coupled to the multimedia source processing module for receiving the multimedia summary candidate to generate a multimedia summary list and check whether multimedia summary list contains a pre-determined threshold. If no threshold is pre-determined, the multimedia source summary generation module outputs the multimedia summary candidate to join the multimedia summary list. If the threshold is pre-determined, the multimedia source summary generation module checks whether the multimedia summary candidate meets the pre-determined threshold. If the multimedia summary candidate meets the pre-determined threshold, the multimedia source summary generation module joins the multimedia summary candidate to the multimedia summary list. If the multimedia summary candidate does not meet the pre-determined threshold, the multimedia source summary generation module ignores the multimedia summary candidate. Lastly, the multimedia source summary generation module combines the multimedia summary candidate in the multimedia summary candidate list to generate a multimedia summary.

The above and other aspects of the invention will become better understood with regard to the following detailed description of the preferred but non-limiting embodiment (s). The following description is made with reference to the accompanying drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

For anyone in the industry of the technology field to clearly understand the object, technical features and advantages of the present invention and be able to implement the present invention, a number of exemplary embodiments are disclosed below with detailed descriptions and accompanying drawings. The accompanying drawings only illustrate the features of the present invention and are not necessarily based on actual sizes and scales. The technologies generally known to anyone ordinarily skilled in the art is omitted in the descriptions of the implementation of the present invention.

Figure 1:
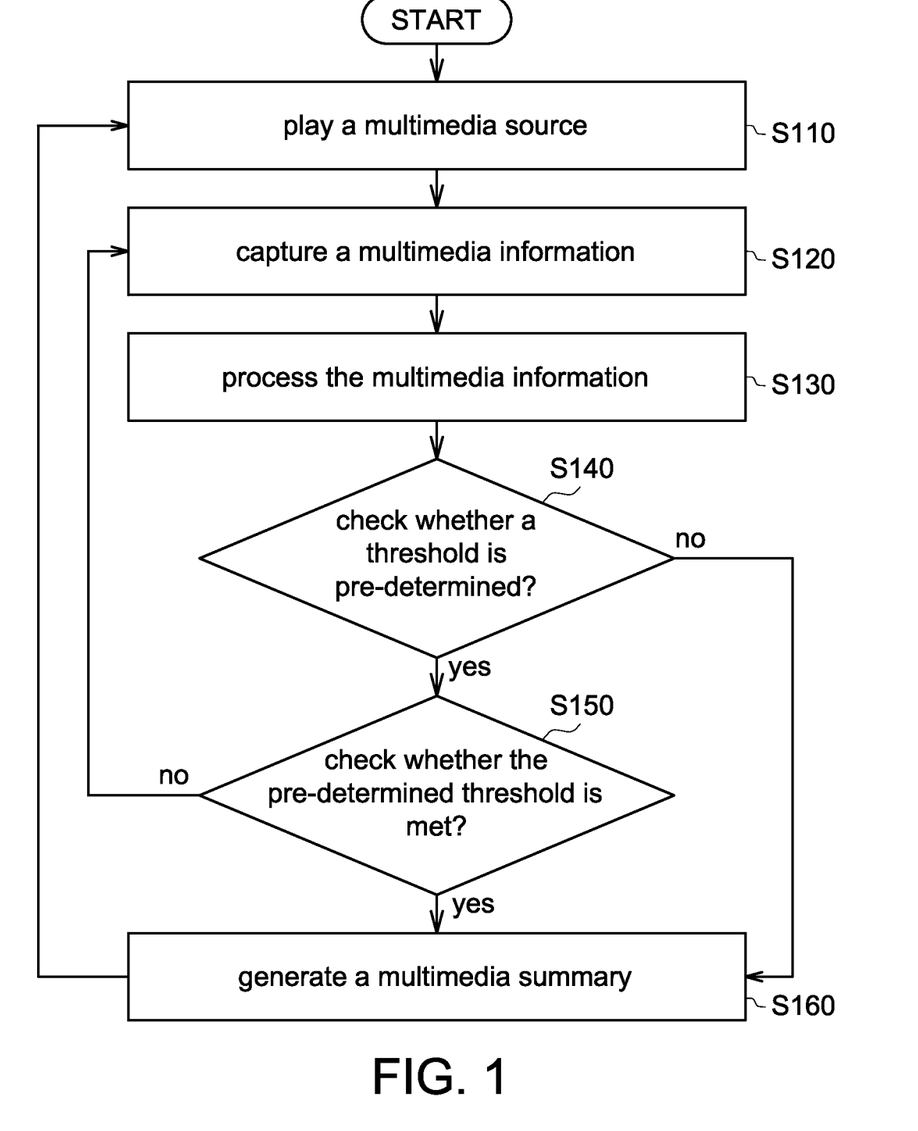
FIG. 1 is a flowchart of multimedia summary generation according to an exemplary embodiment of the present disclosure.

FIG. 1 is a flowchart of multimedia summary generation according to an exemplary embodiment of the present disclosure. A method for multimedia summary generation is adapted in a multimedia system. The method includes following steps. In step S110, a multimedia source, such as a TV program or an on-demand film, is played. In step S120, a multimedia information, such as a video clip or a picture of a program, is captured from the multimedia source. Suppose a current picture is captured. When a capture instruction is received, a frame of a current TV program or a picture of a current multimedia content is captured and saved in a server or a corresponding storage device. Suppose a video clip is captured. When a start point instruction and an end point instruction for capturing the video clip are received, the system, based on the received instructions of a capture interval, will capture the video clip of the current TV program or the frame of the multimedia content and save it in a server or a corresponding storage device. Apart from the abovementioned information, the multimedia information may further include a user-input information or a relevant content captured from the Internet. Furthermore, when the system captures the multimedia information, through the correspondence information provided by a content supplier, the correspondence information of the multimedia information is synchronically recorded. The relevant correspondence information includes an instant relevant information, such as channel name, program name, capture time, actor's name, title of special event, or a combination thereof. The relevant correspondence information also can be realized by a user-input content or a relevant content captured from the Internet.

In step S130, after the multimedia information is captured, the system processes the result of the multimedia information according to a pre-determined condition to generate a multimedia summary candidate. Exemplarily but not restrictively, the pre-determined condition at least includes system setting value, overlapping time, maximum video clip length, minimum video clip length, people capturing ratio or a combination thereof for determining a start point and an end point of the video clip. Furthermore, the pre-determined condition may further comprise screening video clips and pictures similar to the video clip and the picture from the multimedia information by using a clustering algorithm to from a multimedia summary candidate group.

The system setting value is exemplified as follows. If the captured multimedia information is a video clip, then a fixed time segment after the start point of the capture instruction is defined as a multimedia information segment. If the captured video clip has an overlapping time, and the start point and the end point are not the same, then maximum video clip length or the minimum video clip length can be taken according to the system setting value, or the start point and the end point of the video clip can be determined according to the people capturing ratio. If the multimedia information is a picture, then multiple multimedia summary candidates can be generated in step S130. The pre-determined condition at least includes but is not limited to system setting value, people capturing ratio, capturing frequency or a combination thereof.

In step S130, screening can be performed according to a clustering algorithm, such as the K-means algorithm, for performing clustering computation on the multimedia summary candidate. After the clustering computation is performed, a multimedia candidate list is formed of similar multimedia summary candidates and outputted to generate a multimedia summary.

Then, a multimedia summary list is formed of multimedia summary candidates generated in step S130. The multimedia summary candidates can be realized by the processed video clip and the processed picture in step 130. In step S140, whether a threshold for screening multimedia list is pre-determined is checked. This is because the results captured by the user may have different quantities reflecting the popularity of the multimedia source. If there is only one user capturing the clip of a multimedia source a user, the quantity is too small and lacks of representativeness. Therefore, the system can set a basic threshold to screen out the multimedia summaries whose quantity is smaller than the basic threshold. The basic threshold can be used for the first stage screening. The pre-determined threshold at least can be realized by number of users selecting the multimedia summary candidate, ratio of the number of users selecting the multimedia summary candidate or a combination thereof.

In step S140, a pre-determined threshold for screening multimedia list is checked. If the multimedia summary candidate is a video clip, then the quantity of multimedia summary candidates within the same time interval is calculated. If the calculated quantity meets a pre-determined quantity, then the multimedia summary candidate is combined in the multimedia summary list. If the calculated quantity does not meet the pre-determined quantity, then the multimedia summary candidate is ignored. If the multimedia summary candidate is a picture, then similar pictures are compared by way of image processing and the quantity of similar pictures is calculated. If the quantity of similar pictures meets the threshold, then the multimedia summary candidate is combined in the multimedia summary list. If the calculated quantity does not meet the pre-determined quantity, then the multimedia summary candidate is ignored.

In step S140, if it is determined that the system does not have a pre-determined threshold, then the method proceeds to step 160. In step 160, the multimedia summary candidate list is directly outputted to generate a multimedia summary. Before the multimedia summary is outputted, the multimedia candidate list is outputted according to a sorting criterion such as multimedia information time, multimedia summary time or number of capturing people.

In step S140, if it is determined that the system has a pre-determined threshold, then the method proceeds to step S150. In step 150, the quantity of captured multimedia summary candidates is calculated, and whether the calculated quantity meets the pre-determined threshold is checked. If it is determined that the calculated quantity meets the pre-determined threshold, this implies that a certain degree of representativeness is reached, and the method proceeds to step S160. In step S160, the multimedia summary candidate is outputted to be part of the multimedia summary. If it is determined that the calculated quantity does not meet the pre-determined threshold, then the system continues to wait for subsequent captured results until the multimedia source is played to the end.

Figure 2A:
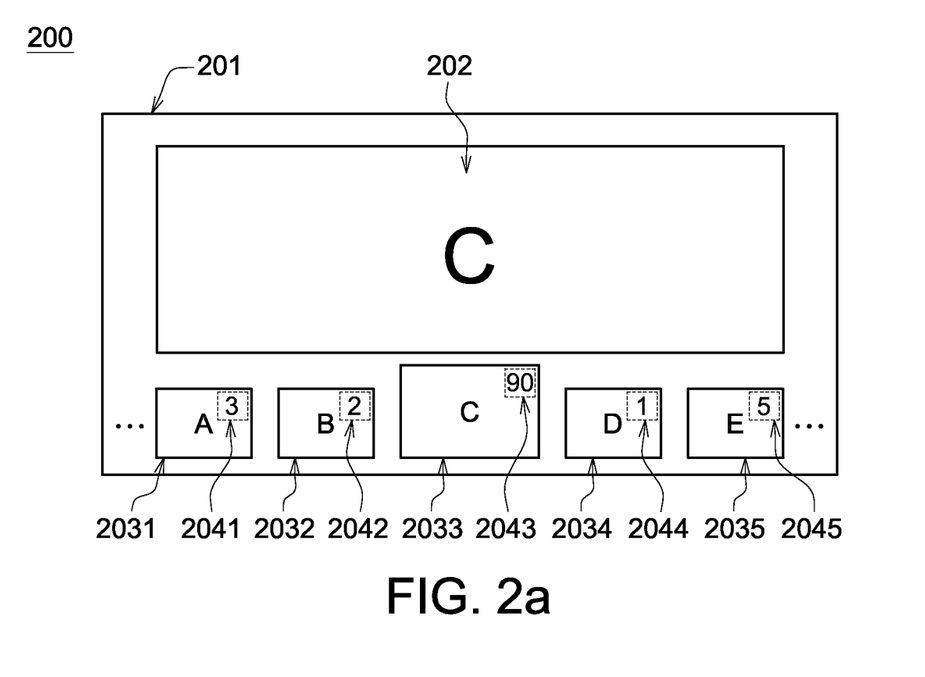
FIG. 2a is a schematic diagram of a multimedia source according to an exemplary embodiment of the present disclosure.
Figure 2B:
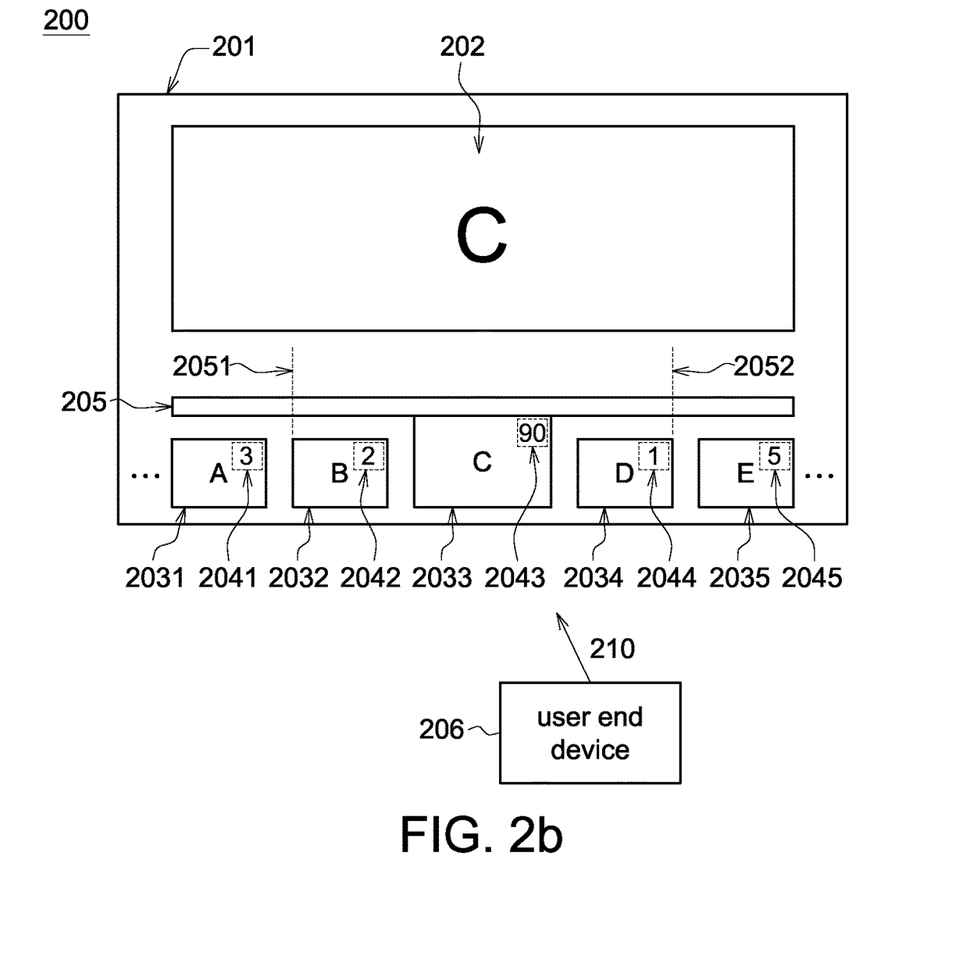
FIG. 2b is a schematic diagram of a multimedia source according to an exemplary embodiment of the present disclosure.
Figure 2C:
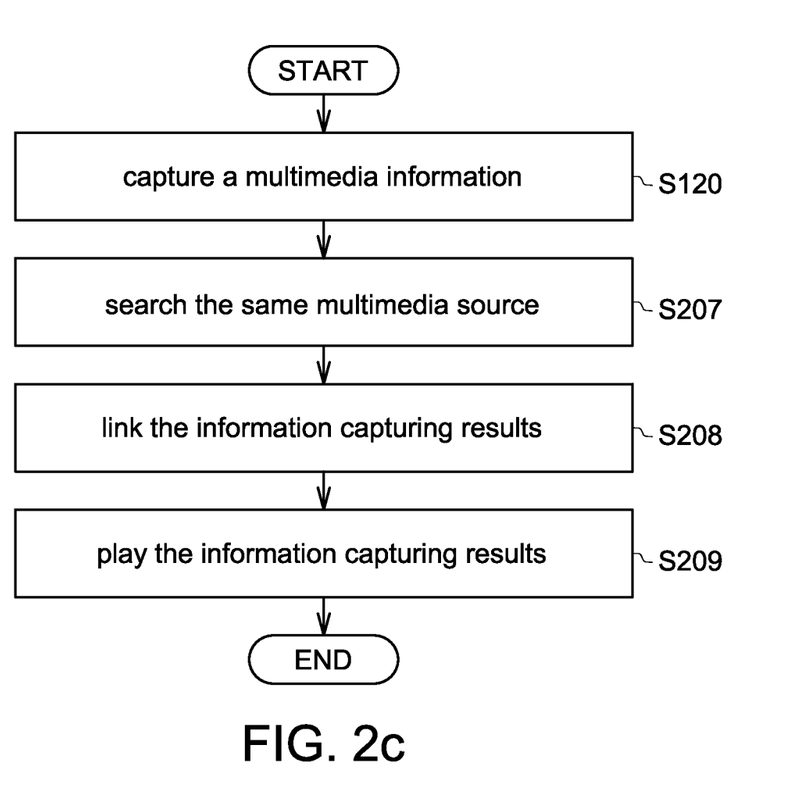
FIG. 2c is a flowchart of multimedia information arrangement according to an exemplary embodiment of the present disclosure.

Refer to FIG. 2a and FIG. 2c at the same time. In step S120, a multimedia information is captured from a multimedia source. In step S207, the results of the captured multimedia information are arranged, and the time interval having the same TV program name or the same multimedia source name is searched from an electronic program guide (EPG) of the programs. In step S208, relevant multimedia information, such as video clip or picture, is linked to the multimedia source, such as TV program or on-demand video. In step S209, when other viewers are watching the same multimedia source 202, multimedia information 2031~2035 captured by the public will be played on the display 201. The timestamp of the multimedia source 202 is used as a reference, and the multimedia information 2031~2035 are sequentially listed at the bottom of the frame with which the viewers can quickly browse these multimedia information to understand the brilliant clips of the program or the multimedia content. Meanwhile, the capturing frequencies of the multimedia information 2041-2045 are synchronically played on the display 202.

Refer to FIG. 2a and FIG. 2c. In step S207, the content provider of multimedia source can arrange relevant program and commodity information according to the multimedia information and the capturing frequencies of the multimedia information to increase the advertisement effect. Furthermore, if the multimedia source is a TV channel, after the viewer turns on a particular channel, the function of brilliant clips of the channel can be activated. The channel name can be used as an index value, and the multimedia information, such as video clips or pictures, captured from the channel in the same day, can be listed at the bottom of the frame for the consumers to quickly retrieve the brilliant clips of the channel. Similarly, brilliant clips of a program, such as the brilliant clips of a particular actor's performance or the brilliant clips of a specific event, can be extracted according to other conditions.

Another exemplary embodiment of the present invention is disclosed with reference to FIG. 2b and FIG. 2c. If a user suddenly finds his/her interested video clips 2032-2034 when watching a gourmet program 202, the user can use a user end device 206, such as a hand-held device, a notebook computer or a PC, to select his/her interested video clip. The user end device 206 can send message of the captured clips of the multimedia information, such as the start time 2051 and the end time 2052 on the time line 205 of the captured film, to the multimedia system, which edits on the video clip, and further generates an Internet spread website in step S208 for the user to retrieve via the Internet. Meanwhile, during the replay of a program, the time interval having the same TV program name or the same multimedia name and the network multimedia having the same TV program name or the same multimedia name can be linked to the program within the time interval through the links of the information capturing results generated in step S208. When other users are watching the replay, the network multimedia service or the next episode of the program, they can quickly browse their interested clips through a hand-held device, an Internet TV, or a PC or through the links of the information capturing results. The TV content providers can additionally insert relevant program information or commodity advertisement, such as the information of finding a gourmet shop, and information related to the links of the information capturing results.

Another exemplary embodiment according to the present invention is disclosed with reference to FIG. 2b and FIG. 2c. Suppose the user is watching a live baseball game which may take up to 3 hours. If the user watches the baseball game by using the present system, the user may find other users' brilliant clips of the live play in the Internet TV or a network film according to the links of the information capturing results generated in step S208, and can further watch these brilliant clips through a smart Internet TV. Also, the user can further find out, within a specific time interval, how many users are also capturing the clip according to the capturing frequencies of the multimedia information collected by the system, and further use the capturing frequencies to determine the popularity of the captured clip. All users who capture a film can use the user device 206 to transmit a user instruction 210 for such as marking, commenting or searching the captured film. When a viewer is watching the replay or the film through the network, the viewer can use a user device, such as a remote controller or a hand-held device, to input a keyword through the user instruction 210, and the display 201 will play all multimedia information containing the keyword for the viewer to browse.

Figure 3:
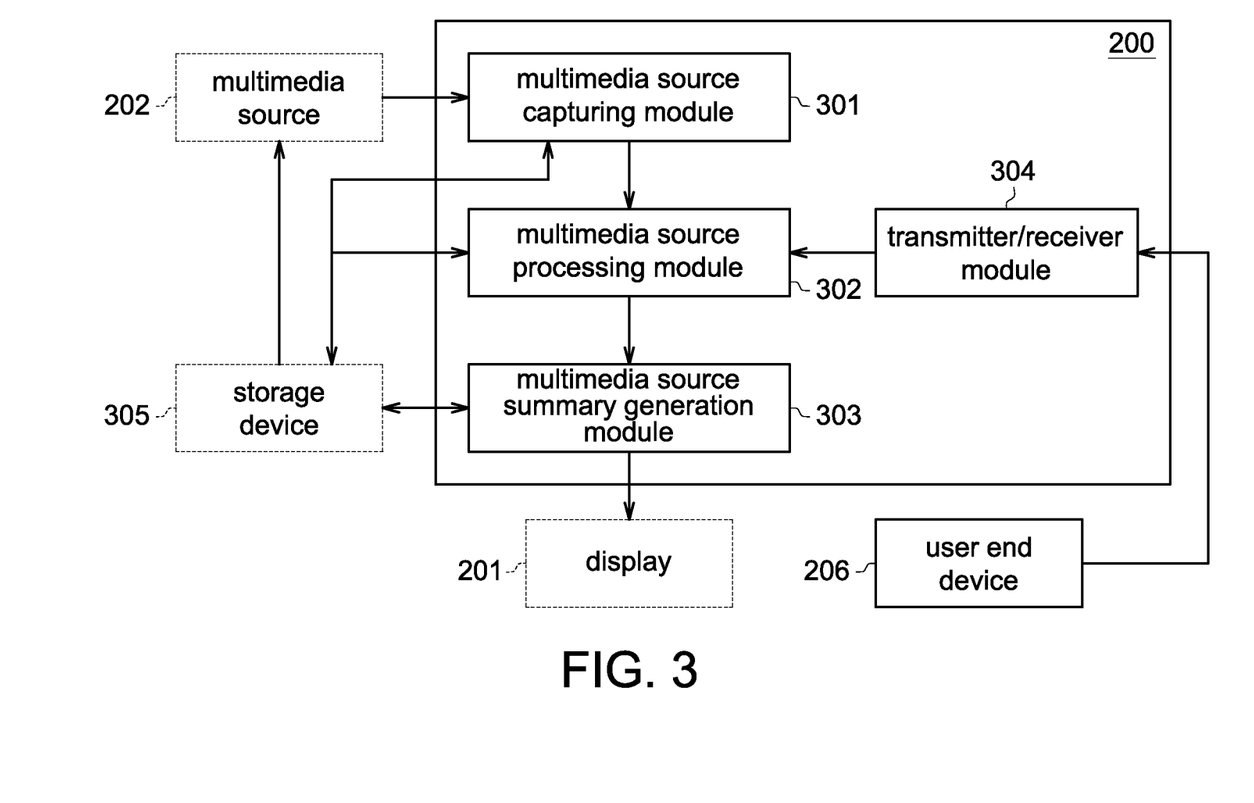
FIG. 3 is a schematic diagram of a multimedia source according to an exemplary embodiment of the present disclosure.

Another exemplary embodiment according to the present invention is disclosed with reference to FIG. 3. The multimedia system 200 of the present invention at least includes a transmitter/receiver module 304, a multimedia source capturing module 301, a multimedia source processing module 302, and a multimedia source summary generation module 303. The transmitter/receiver module 304 is for transmitting data to/receiving data from a user end device or other source, and the data is such as from the Internet. The multimedia source capturing module 301 is for capturing multimedia information from the playing multimedia source. The multimedia information at least includes a video clip or a picture. The multimedia system 200 may further include other elements such as processor and memory which are not illustrated in FIG. 3.

The multimedia source processing module 302 is coupled to the multimedia source capturing module 301 for receiving the multimedia information captured by the multimedia source capturing module and for processing the video clip and the picture of the multimedia information according to a pre-determined condition to generate a multimedia summary candidate. If the multimedia information is a video clip, the pre-determined condition at least includes but is not limited to system setting value, overlapping time, maximum video clip length, minimum video clip length, people capturing ratio or a combination thereof for determining a start point and an end point of the video clip. If the multimedia information is a picture, the pre-determined condition at least includes but is not limited to system setting value, people capturing ratio, capturing frequency or a combination thereof. Furthermore, the pre-determined condition may further comprise screening video clips and pictures similar to the video clip and the picture from the multimedia information by using a clustering algorithm to from a multimedia summary candidate group.

The multimedia source summary generation module 303 is coupled to the multimedia source processing module 302 for receiving the multimedia summary candidate to generate a multimedia summary list, and checks whether the multimedia summary list contains a pre-determined threshold. The pre-determined threshold at least can be realized by number of users selecting the multimedia summary candidate, ratio of the number of users selecting the multimedia summary candidate or a combination thereof. If the system does not contain any pre-determined thresholds, the multimedia summary candidate list is directly outputted to generate a multimedia summary. Before the multimedia summary is outputted, the multimedia candidate list can be outputted according to a sorting criterion based on such as multimedia information time, multimedia summary time or number of capturing people. If the system contains a pre-determined threshold, then the multimedia source summary generation module 303 calculates and checks whether the quantity of the captured multimedia summary candidates meets the threshold. If it is determined that the threshold is met, this implies that a certain degree of representativeness is reached and the captured multimedia summary candidate is outputted to be part of the multimedia summary is outputted. If it is determined that the pre-determined threshold is not met, then the system continues to wait for subsequent captured results until the multimedia source is played to the end.

An embodiment according to the present invention is disclosed with reference to FIG. 3. The multimedia source can be realized by a multimedia source such as a video stream, an on-demand video, a digital TV program, a DVD or a VCD. The multimedia system 200 of the present invention multimedia system 200 may further include a display device 201 for displaying multimedia source, multimedia information and multimedia summary. The multimedia system 200 may further include a storage device 305 for accessing the data generated by a multimedia source capturing module 301, a multimedia source processing module 302, and a multimedia source summary generation module 303 or for storing or buffering the playing or to-be-played multimedia source.

Another embodiment according to the present invention is disclosed with reference to FIG. 3, FIG. 2b and FIG. 2c. The multimedia system 200 of the present invention may further include a user end device 206, such as a hand-held device, a notebook computer or a PC. The user can operate the user end device 206 to communicate with the transmitter/receiver module 304 and operate the multimedia system. If a user suddenly finds his/her interested video clips 2032-2034 when watching a gourmet program 202, the user can use a user end device 206, such as a hand-held device, a notebook computer or a PC, to select his/her interested video clip. The user end device 206 can send message of the captured clips of the multimedia information, such as the start time 2051 and the end time 2052 on the time line 205 of the captured film to the multimedia system, which further edits on the video clip, and further generates an Internet spread website in step S208 for the user to retrieve via the Internet. Meanwhile, when a program is replayed, the time interval having the same TV program name or the same multimedia name and the network multimedia having the same TV program name or the same multimedia name can be linked to the program within the time interval through the links of the information capturing results generated in step S208. When other users are watching the replay, the network multimedia service or the next episode of the program, they can quickly browse their interested clips through a hand-held device, an Internet TV, or a PC or through the links of the information capturing results. TV content providers can additionally insert relevant program information or commodity advertisement, such as the information of finding a gourmet ship, information with respect to the links of the information capturing results.

Another embodiment according to the present invention is disclosed with reference to FIG. 3, FIG. 2a, and FIG. 2c. When a user uses the multimedia system 200 of the present invention to watch a multimedia source, the user may find other users' brilliant clips in the playing multimedia source according to the links of the information capturing results generated in step S208, and can further watch these brilliant clips through a display device. Also, the user can further find out within a specific time interval how many users are also capturing the clip and further determine the popularity of the clips according to the capturing frequencies of the multimedia information collected by the system. All users who capture films can use the user device 206 to transmit user instruction 210 for such as marking, commenting or searching the captured film. When a viewer is watching the replay or the film through the network, the viewer can use a user device, such as a remote controller or a hand-held device, to input a keyword through the user instruction 210, and the display 201 will play all multimedia information containing the keyword for the viewer to browse.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for multimedia summary generation adapted to a multimedia system, wherein the method comprises following steps:

capturing a multimedia information from a multimedia source, wherein the multimedia information comprises at least a video clip or a picture;

processing the video clip or the picture of the multimedia information according to a predetermined condition to generate a multimedia summary candidate, wherein the predetermined condition comprises at least a system setting value, an overlapping time, a maximum video clip length, a minimum video clip length, a people capturing ratio or a combination thereof, for determining a start point and an end point of the video clip, wherein the predetermined condition further comprises screening video clips and pictures similar to the video clip and the picture from the multimedia information by using a clustering algorithm to form a multimedia summary candidate group;

generating a multimedia summary list by checking whether a threshold is predetermined;

outputting the multimedia summary candidate to join the multimedia summary list when no threshold is predetermined, checking whether the multimedia summary candidate meets the predetermined threshold when the threshold is predetermined;

joining the multimedia summary candidate to the multimedia summary list when the multimedia summary candidate meets the predetermined threshold;

ignoring the multimedia summary candidate when the multimedia summary candidate does not meet the predetermined threshold;

combining the multimedia summary candidate in the multimedia summary candidate list to generate a multimedia summary; and sending message of the video clips and pictures similar to the video clip and the picture from the multimedia information to generate an Internet spread website via the Internet after forming the multimedia summary candidate group, wherein the predetermined threshold is realizable at least by a number of users selecting the multimedia summary candidate, a ratio of the number of users selecting the multimedia summary candidate or a combination thereof.

2. The method according to claim 1, wherein the multimedia summary candidate is realized by the processed video clip and the processed picture.

3. The method according to claim 1, wherein the capturing multimedia information further comprises capturing correspondence information between the video clip and the picture, and the correspondence information comprises at least a channel name, a program name, a capturing time, an actor's name, a title of a specific event or a combination thereof.

4. The method according to claim 3, wherein the correspondence information is realized by a user-input content or a relevant content captured from the Internet.

5. The method according to claim 1, further comprising a multimedia information arrangement step, the multimedia information arrangement step comprising:
searching a relevant multimedia source from the multimedia information;
establishing a linking relationship between the multimedia information and the searched relevant multimedia source; and
playing the multimedia information.

6. The method according to claim 5, wherein the linking relationship comprises at least a correspondence relationship between the multimedia information and the multimedia source, an Internet access address of the multimedia information, or a combination thereof.

7. The method according to claim 5, wherein the multimedia information arrangement step further comprises receiving at least a mark, a comment, a keyword or a combination thereof from a user end.

8. A system for multimedia summary generation, wherein the system comprises:
a processor containing a plurality of modules, including:
a transmitter/receiver module for transmitting/receiving data;
a multimedia source capturing module for capturing multimedia information from the multimedia source, wherein the multimedia information comprises at least a video clip or a picture;
a multimedia source processing module coupled to the multimedia source capturing module for receiving the multimedia information captured by the multimedia source capturing module and for processing the video clip and the picture of the multimedia information according to a predetermined condition to generate a multimedia summary candidate, wherein the predetermined condition comprises at least a system setting value, an overlapping time, a maximum video clip length, a minimum video clip length, a people capturing ratio or a combination thereof, for determining a start point and an end point of the video clip, wherein the predetermined condition further comprises screening video clips and pictures similar to the video clip and the picture from the multimedia information by using a clustering algorithm to form a multimedia summary candidate group;
a multimedia source summary generation module coupled to the multimedia source processing module for receiving the multimedia summary candidate to generate a multimedia summary list, wherein
the multimedia source summary generation module checks whether the multimedia summary list contains a predetermined threshold,
the multimedia source summary generation module outputs the multimedia summary candidate to join the multimedia summary list when no threshold is predetermined,
the multimedia source summary generation module checks whether the multimedia summary candidate meets the predetermined threshold when the threshold is predetermined,
the multimedia source summary generation module joins the multimedia summary candidate to the multimedia summary list when the multimedia summary candidate meets the predetermined threshold,
the multimedia source summary generation module ignores the multimedia summary candidate when the multimedia summary candidate does not meet the predetermined threshold, and
the multimedia source summary generation module combines the multimedia summary candidate in the multimedia summary candidate list to generate a multimedia summary;
the multimedia source summary generation module sends message of the video clips and pictures similar to the video clip and the picture from the multimedia information to generate an Internet spread website via the Internet after forming the multimedia summary candidate group;
wherein the modules are operated under the control of the processor;

wherein the predetermined threshold of the multimedia source summary generation module comprises at least a number of users selecting the multimedia summary candidate, a ratio of the number of users selecting the multimedia summary candidate, or a combination therefore.

9. The system according to claim 8, wherein the multimedia summary candidate generated by the multimedia source processing module is the video clip and the picture processed according to the predetermined condition.

10. The system according to claim 8, wherein the multimedia information captured by the multimedia source capturing module further comprises a correspondence information between the video clip and the picture, and the correspondence information comprises at least a channel name, a program name, a capturing time, an actor's name, a title of a specific event or a combination thereof.

11. The system according to claim 8, wherein the multimedia information captured by the multimedia source capturing module further comprises a user-input information or a relevant content captured from the Internet.

12. The system according to claim 8, wherein the multimedia source processing module further comprises executing a step of multimedia information arrangement, the executing a step of multimedia information arrangement comprising:

searching a relevant multimedia source from the multimedia information;

establishing a linking relationship between the multimedia information and the searched relevant multimedia source; and playing the multimedia information.

13. The system according to claim 12, wherein the linking relationship comprises at least a correspondence relationship between the multimedia information and the multimedia source, an Internet access address of the multimedia information or a combination thereof.

14. The system according to claim 8, further comprising a user end device for transmitting the multimedia information to the transmitter/receiver device, wherein, the multimedia information comprises at least a mark, a comment, a keyword or a combination thereof, transmitted from the user end.

* * * * *